(12) United States Patent
Higaki et al.

(10) Patent No.: US 10,196,710 B1
(45) Date of Patent: Feb. 5, 2019

(54) METHOD FOR RECOVERING SCANDIUM (71) Applicant: SUMITOMO METAL MINING CO., LTD., Tokyo (JP)

(72) Inventors: Tatsuya Higaki, Niihama (JP); Shin-ya Matsumoto, Niihama (JP); Hidemasa Nagai, Niihama (JP); Hiroshi Kobayashi, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/071,920

(22) PCT Filed: Jan. 11, 2017

(86) PCT No.: PCT/JP2017/000601
§ 371 (c)(1),
(2) Date: Jul. 23, 2018

(87) PCT Pub. No.: WO2017/130692
PCT Pub. Date: Aug. 3, 2017

(30) Foreign Application Priority Data

Jan. 25, 2016 (JP) .................................. 2016-011739

(51) Int. Cl.
*C22B 3/24* (2006.01)
*C22B 3/42* (2006.01)
(Continued)

(52) U.S. Cl.
CPC ................ *C22B 59/00* (2013.01); *C22B 3/08* (2013.01); *C22B 3/24* (2013.01); *C22B 3/42* (2013.01); *C22B 3/44* (2013.01)

(58) Field of Classification Search
CPC .................................................... C22B 59/00
See application file for complete search history.

(56) References Cited

U.S. PATENT DOCUMENTS 6,312,500 B1    11/2001    Duyvesteyn et al.
9,963,762 B2 *   5/2018    Higaki ...................... C22B 3/44
(Continued)

FOREIGN PATENT DOCUMENTS

JP    03-173725 A    7/1991
JP    09-194211 A    7/1997
(Continued)

OTHER PUBLICATIONS

Notice of Reasons for Rejection dated Aug. 15, 2017, issued to JP Application No. 2016-011739 and English translation thereof.
(Continued)

*Primary Examiner* — Melissa S Swain
(74) *Attorney, Agent, or Firm* — Locke Lord LLP (57) ABSTRACT

The method for recovering scandium pertaining to the present invention has: a first neutralization step for passing a solution containing scandium over an ion exchange resin, adding a neutralizing agent to the eluent eluted from the ion exchange resin and performing a neutralization treatment, and obtaining a primary neutralized sediment and a primary neutralized filtrate by solid-liquid separation; a second neutralization step for further adding a neutralizing agent to the primary neutralized filtrate and performing a neutralization treatment, and obtaining a secondary neutralized sediment and a secondary neutralized filtrate by solid-liquid separation; a hydroxide dissolution step for adding acid to the secondary neutralized sediment and obtaining a hydroxide solution; a solvent extraction step for subjecting the hydroxide solution to solvent extraction; and a scandium recovery step for recovering scandium oxide from a raffinate separated in the solvent extraction step.

6 Claims, 4 Drawing Sheets

(51) Int. Cl.
      *C22B 3/44*         (2006.01)
      *C22B 59/00*      (2006.01)
      *C22B 3/08*         (2006.01)

(56) References Cited

U.S. PATENT DOCUMENTS

| | | |
|---|---|---|
| 10,081,851 B2 * | 9/2018 | Matsuoka .................. C22B 3/42 |
| 2012/0204680 A1 | 8/2012 | Duyvesteyn |
| 2016/0010177 A1 | 1/2016 | Goto et al. |
| 2016/0340757 A1 | 11/2016 | Higaki et al. |
| 2017/0321301 A1 | 11/2017 | Matsuoka et al. |

FOREIGN PATENT DOCUMENTS

| | | | |
|---|---|---|---|
| JP | 09-291320 | A | 11/1997 |
| JP | 2000-313928 | A | 11/2000 |
| JP | 5595554 | B1 | 9/2014 |
| JP | 5967284 | B2 | 8/2016 |
| JP | 2017-110257 | A | 6/2017 |
| WO | 2014/110216 | A1 | 7/2014 |
| WO | 2015/115269 | A1 | 8/2015 |
| WO | 2016/084830 | A1 | 6/2016 |

OTHER PUBLICATIONS

International Search Report dated Apr. 11, 2017, issued for PCT/JP2017/000601.
Examination report dated Aug. 9, 2018, issued to AU Patent Application No. 2017213212.

* cited by examiner

METHOD FOR RECOVERING SCANDIUM

TECHNICAL FIELD

The present invention relates to a method for recovering scandium, and more particularly, it relates to a method for recovering scandium by which scandium contained in nickel oxide ore is easily and efficiently recovered.

BACKGROUND ART

Scandium is extremely valuable as an additive for high-strength alloys and an electrode material for fuel cells. However, scandium has not yet been used widely due to the small production quantity and high cost thereof.

Incidentally, a trace amount of scandium is contained in nickel oxide ore such as laterite ore and limonite ore. However, nickel oxide ore has not been industrially utilized as a nickel raw material for a long time since it contains nickel at a low grade. Hence, it has been rarely studied to industrially recover scandium from nickel oxide ore.

Nonetheless, in recent years, the HPAL process has been emerging as a practical method, in which nickel oxide ore is introduced into a pressure vessel along with sulfuric acid, and heated at a high temperature of 240° C. to 260° C. to allow solid-liquid separation into a nickel-containing leachate and a leach residue. In the HPAL process, a neutralizing agent is added to the leachate obtained to separate impurities, and then a sulfurizing agent is added to the resulting leachate from which impurities are separated out, allowing recovery of nickel as nickel sulfide. Subsequently, this nickel sulfide may be subjected to a known nickel refinement process to obtain electrolytic nickel and nickel salt compounds.

In the HPAL processes as described above, scandium contained in nickel oxide ore will be contained in a leachate along with nickel (see Patent Document 1). Subsequently, when a neutralizing agent is added to a leachate obtained from the HPAL process to separate impurities, and a sulfurizing agent is then added, nickel is recovered as nickel sulfide while scandium remains in the acidic solution after addition of the sulfurizing agent. In this way, nickel can effectively be separated from scandium by using the HPAL process.

A method of separating scandium by using a chelating resin has also been documented (see Patent Document 2). Specifically, according to the method disclosed in Patent Document 2, nickel-containing oxide ore is first treated at high temperature and high pressure under an oxidizing atmosphere to selectively extract nickel and scandium into an acidic aqueous solution. Subsequently, the pH of the resulting acidic solution is adjusted to the range of 2 to 4, and nickel is then selectively precipitated and recovered as a sulfide by means of a sulfurizing agent. Next, scandium is adsorbed to a chelating resin by bringing the solution obtained after nickel recovery into contact with the chelating resin, the chelating resin is washed with a dilute acid, and then scandium is eluted from the chelating resin by bringing the chelating resin after washing into contact with a strong acid.

Further, as a method of recovering scandium from the aforementioned acidic solution, the method of recovering scandium by means of solvent extraction has also been proposed (see Patent Documents 3 and 4). Specifically, according to the method disclosed in Patent Document 3, an organic solvent is first added to an aqueous-phase scandium-containing solution to extract a scandium component into the organic solvent, the organic solvent comprising 2-ethylhexyl sulfonic acid-mono-2-ethylhexyl diluted with kerosene, and the aqueous-phase scandium-containing solution containing one or more of at least iron, aluminum, calcium, yttrium, manganese, chromium, and magnesium in addition to scandium. Then, in order to separate yttrium, iron, manganese, chromium, magnesium, aluminum, and calcium extracted into the organic solvent along with scandium, an aqueous solution of hydrochloric acid is added, and scrubbing is performed to remove these elements. Then, an aqueous solution of NaOH is added to the organic solvent to transform scandium remaining in the organic solvent into a slurry containing $Sc(OH)_3$, and the slurry is filtered to obtain $Sc(OH)_3$, which is then dissolved in hydrochloric acid to obtain an aqueous solution of scandium chloride. Then, oxalic acid is added to the aqueous solution of scandium chloride thus obtained to obtain a precipitate of scandium oxalate, and this precipitate is filtered to separate iron, manganese, chromium, magnesium, aluminum, and calcium into the filtrate and then calcined to obtain high purity scandium oxide.

Moreover, Patent Document 4 describes a method of selectively separating and recovering scandium from a scandium-containing supply liquid, the method comprising: bringing the scandium-containing supply liquid into contact with an extracting agent at a certain ratio in a batch process.

As the grade of scandium recovered by these methods, it is known that a purity of about 95% to 98% in terms of scandium oxide is obtained. However, a higher purity, for example, a grade of about 99.9% is required in order to exert favorable properties in applications such as electrolytes of fuel cells of which the demand has increased in recent years although it is a sufficient grade for applications such as addition to alloys.

However, various impurity elements such as manganese and magnesium are contained in the nickel oxide ore described above in addition to iron and aluminum although the kinds and amounts thereof vary depending on the region from which the nickel oxide ore is mined.

The impurity elements have acceptable upper limits of grade and each element is required to be separated and removed to a content equal to or less than the acceptable limit in the case of using scandium in applications such as electrolytes of fuel cells.

However, some impurity elements exhibit behavior similarly to that of scandium in the chelating resins and the organic solvents disclosed in Patent Document 2 and Patent Document 3, and it is thus difficult to effectively separate and recover scandium. In addition, impurities such as iron and aluminum are contained in the leachate of nickel oxide ore at much higher concentrations than scandium, and a method suitable for industrial recovery of high purity scandium from nickel oxide ore has not been found out since the recovery of scandium is also affected by these large amounts of impurities.

As described above, it has been difficult to efficiently recover high purity scandium by effectively separating a large variety of impurities such as iron and aluminum contained in large amounts even when it is attempted to recover scandium from nickel oxide ore.

Patent Document 1: Japanese Unexamined Patent Application, Publication No. H03-173725
Patent Document 2: Japanese Unexamined Patent Application, Publication No. H09-194211
Patent Document 3: Japanese Unexamined Patent Application, Publication No. H09-291320

Patent Document 4: PCT International Publication No. WO2014/110216

DISCLOSURE OF THE INVENTION

Problems to be Solved by the Invention

The present invention has been proposed in view of the circumstances as described above, and an object thereof is to provide a method for recovering scandium by which high purity scandium can be easily and efficiently recovered from nickel oxide ore.

Means for Solving the Problems

The inventors of the present invention have conducted intensive investigations to solve the problems described above. As a result, it has been found out that it is possible to easily and efficiently recover high purity scandium from nickel oxide ore by subjecting a solution obtained through a two-stage neutralization treatment of an eluate obtained by allowing an acidic solution containing scandium to pass through an ion exchange resin to solvent extraction, and the present invention has been thus completed. That is, the present invention provides the following.

(1) A first embodiment of the present invention provides a method for recovering scandium, including: a first neutralization step of allowing a solution containing scandium to pass through an ion exchange resin, adding a neutralizing agent to an eluate eluted from the ion exchange resin, performing a neutralization treatment, and obtaining a primary neutralized precipitate and a primary neutralized filtrate by solid-liquid separation; a second neutralization step of further adding a neutralizing agent to the primary neutralized filtrate, performing a neutralization treatment, and obtaining a secondary neutralized precipitate and a secondary neutralized filtrate by solid-liquid separation; a hydroxide dissolution step of adding an acid to the secondary neutralized precipitate to obtain a hydroxide solution; a solvent extraction step of subjecting the hydroxide solution to solvent extraction; and a scandium recovery step of recovering scandium oxide from a raffinate liquid separated in the solvent extraction step.

(2) A second embodiment of the present invention provides the method for recovering scandium according to the first embodiment, in which pH of the eluate is adjusted to the range of 3.5 to 4.5 in the first neutralization step.

(3) A third embodiment of the present invention provides the method for recovering scandium according to the first or second embodiment, in which pH of the primary neutralized filtrate is adjusted to the range of 5.5 to 6.5 in the second neutralization step.

(4) A fourth embodiment of the present invention provides the method for recovering scandium according to any one of the first to third embodiments, in which the secondary neutralized precipitate is dissolved using sulfuric acid as the acid so that pH of a hydroxide solution to be obtained is maintained in the range of 0.8 to 1.5 in the hydroxide dissolution step.

(5) A fifth embodiment of the present invention provides the method for recovering scandium according to any one of the first to fourth embodiments, in which the solution containing scandium to pass through the ion exchange resin is a barren liquor to be obtained by hydrometallurgy of nickel oxide ore, the hydrometallurgy including: a leaching step of leaching the nickel oxide ore with sulfuric acid under high temperature and high pressure to obtain a leachate; a neutralization step of adding a neutralizing agent to the leachate to obtain a neutralized precipitate containing impurities and a post-neutralization liquid; and a sulfuration step of adding a sulfurizing agent to the post-neutralization liquid to obtain nickel sulfide and a barren liquor.

Effects of the Invention

According to the present invention, high purity scandium can simply and efficiently be recovered from nickel oxide ore.

PREFERRED MODE FOR CARRYING OUT THE INVENTION

Below, specific embodiments of the present invention (hereinafter referred to as the "present embodiments") will be described in detail with reference to the drawings. It should be noted that the present invention is not limited to the following embodiments, but can be implemented with appropriate modifications made without departing from the spirit of the present invention. Note that the phrase "X to Y" (X and Y may be any numerical values) as used herein means "X or more and Y or less".

<<1. Method of Recovering Scandium>>

Figure 1:
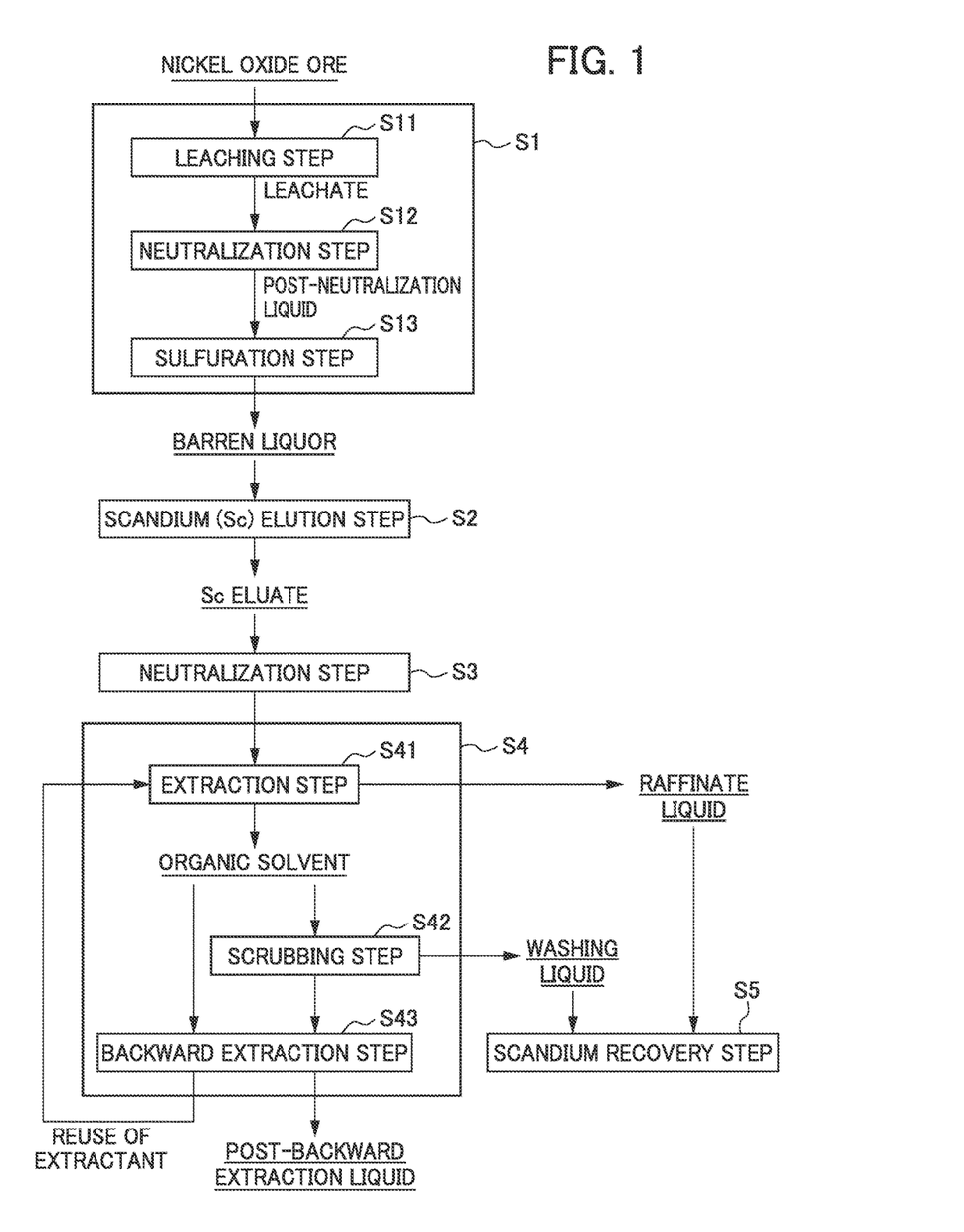
FIG. 1 shows a flow diagram for illustrating the method of recovering scandium.

FIG. 1 is a flow diagram showing an example of the method of recovering scandium according to the present embodiment. The above method of recovering scandium comprises: separating scandium from impurities in a scandium-containing acidic solution obtained by leaching nickel oxide ore with an acid such as sulfuric acid, thereby simply and effectively recovering high purity scandium.

In this method for recovering scandium, an eluate (scandium eluate) obtained by allowing an acidic solution containing scandium to pass through an ion exchange resin to adsorb the scandium to the ion exchange resin and then bringing an acid solution into contact with the ion exchange resin is subjected to a two-stage neutralization treatment to separate impurities and to concentrate scandium. Then, the scandium-concentrated acidic solution is further subjected to solvent extraction using an extractant such as an amine-based extractant to extract impurities contained in the acidic solution into the extractant and thus to separate the impurities from scandium which is to remain in the acidic solution (raffinate liquid) after the extraction.

Scandium contained in the raffinate liquid by this solvent extraction is transformed into a solid shape that is suitably applied as a product, for example, by a method in which a precipitate of a hydroxide is obtained by adding an alkali to the raffinate liquid and performing a neutralization treatment or scandium is recovered as a precipitate of an oxalate by an oxalate-formation treatment using oxalic acid while the residual impurities are separated, whereby scandium is recovered as crystals of high purity scandium hydroxide or scandium oxalate.

Note that the crystals of scandium hydroxide and scandium oxalate thus obtained are transformed into the form of scandium oxide by calcination according to a known method and the like. The scandium oxide thus generated can be used as a material for an electrolyte of a fuel cell and also it can be used in an application in which scandium metal is obtained by a method such as molten salt electrolysis and then added to aluminum to form an alloy.

As described above, in the method for recovering scandium according to the present embodiment, scandium is further concentrated by subjecting the solution (eluate) in which scandium is concentrated through the ion exchange treatment to a two-stage neutralization treatment and then a solvent extraction treatment using a solvent extractant such as an amine-based extractant is performed when separating and recovering scandium. According to such a method, it is possible to more effectively separate impurities and to efficiently recover high purity scandium through a stable operation even from a raw material, which contains a large amount of impurities, such as nickel oxide ore.

More specifically, as shown in the flow diagram of FIG. 1, the method for recovering scandium according to the present embodiment includes a nickel oxide ore hydrometallurgy treatment step S1 of leaching nickel oxide ore with an acid such as sulfuric acid to obtain an acidic solution containing scandium, a scandium elution step S2 of removing impurities from the acidic solution to obtain a scandium eluate in which scandium is concentrated, a neutralization step S3 of adding a neutralizing agent to the scandium eluate and performing a neutralization treatment to obtain a solution (an extraction starting liquid) containing scandium at a high concentration, a solvent extraction step S4 of subjecting the extraction starting liquid obtained to solvent extraction using an amine-based extractant and the like to extract impurities into the extractant and thus to separate the impurities from scandium which is to remain in the acidic solution after the extraction, and a scandium recovery step S5 of recovering scandium from the raffinate liquid.

<<2. Respective Steps in Method for Recovering Scandium>>

<2-1. Step of Hydrometallurgy Treatment of Nickel Oxide Ore>

For the scandium-containing acidic solution from which scandium is to be recovered, an acidic solution obtained by treating nickel oxide ore with sulfuric acid can be used.

Specifically, for the acidic solution to be subjected to solvent extraction, a barren liquor can be used which is obtained through the hydrometallurgy treatment step S1 of nickel oxide ore, the hydrometallurgy treatment step S1 comprising: a leaching step S11 of leaching nickel oxide ore with an acid such as sulfuric acid under high temperature and high pressure to obtain a leachate; a neutralization step S12 of adding a neutralizing agent to the leachate to obtain a neutralized precipitate containing impurities and a post-neutralization liquid; and a sulfuration step S13 of adding a sulfurizing agent to the post-neutralization liquid to obtain nickel sulfide and a barren liquor. Below, the process flow of the hydrometallurgy treatment step S1 of nickel oxide ore will be described.

(1) Leaching Step

The leaching step S11 comprises adding sulfuric acid to a slurry of nickel oxide ore, for example, in a high temperature pressurized vessel (an autoclave) and the like, and stirred at a temperature of 240° C. to 260° C. to form a leach slurry comprising a leachate and a leach residue. Note that a treatment in the leaching step S11 can be performed according to the publicly known HPAL process, which is described, for example, in Patent Document 1.

Here, examples of nickel oxide ore include so-called laterite ore such as limonite ore and saprolite ore. The content of nickel in laterite ore is usually 0.8 wt % to 2.5 wt %, and contained as a hydroxide or a silica magnesia (magnesium silicate) mineral. Further, these types of nickel oxide ore contain scandium.

In the leaching step S11, solid-liquid separation is performed to obtain a leachate containing nickel, cobalt, scandium, and the like; and a leach residue as a hematite while washing the resulting leach slurry comprising the leachate and the leach residue. In the above solid-liquid separation treatment, for example, the leach slurry is mixed with a washing liquid, and then solid-liquid separation is performed in a solid-liquid separation apparatus such as a thickener using an aggregating agent supplied from an apparatus for supplying an aggregating agent and the like. Specifically, the leach slurry is first diluted with the washing liquid, and then the leach residue in the slurry is condensed as a precipitate in the thickener. Note that in the above solid-liquid separation treatment, solid-liquid separation is preferably performed while washing the leach slurry by a multi-stage washing process using multistaged solid-liquid separation cells such as thickeners.

(2) Neutralization Step

The neutralization step S12 comprises adding a neutralizing agent to the leachate obtained from the aforementioned leaching step S11 to adjust pH, thereby obtaining a neutralized precipitate containing impurity elements and a post-neutralization liquid. After the neutralization treatment in the above neutralization step S12, valuable metals such as nickel, cobalt, and scandium will be contained in the post-neutralization liquid while most impurities including iron and aluminum will be included in the neutralized precipitate.

For the neutralizing agent, publicly known substances may be used, including, for example, calcium carbonate, slaked lime, sodium hydroxide, and the like.

In the neutralization treatment of the neutralization step S12, the pH is preferably adjusted to the range of 1 to 4, preferably to the range of 1.5 to 2.5 while preventing oxidation of the leachate separated. When the pH is less than 1, neutralization may be insufficient, and the neutralized precipitate and the post-neutralization liquid may not be separated. On the other hand, when the pH is more than 4, not only impurities including aluminum but also valuable metals such as scandium and nickel may be contained in the neutralized precipitate.

(3) Sulfuration Step

The sulfuration step S13 comprises adding a sulfurizing agent to the post-neutralization liquid obtained from the aforementioned neutralization step S12 to obtain nickel sulfide and a barren liquor. Nickel, cobalt, zinc, and the like are transformed into sulfides, and scandium and the like is contained in the barren liquor after the sulfuration treatment in the above sulfuration step S13.

Specifically, in the sulfuration step S13, a sulfurizing agent such as gaseous hydrogen sulfide, sodium sulfide and hydrogenated sodium sulfide is added to the resulting post-neutralization liquid to form sulfides (a mixture of nickel and cobalt sulfides) comprising nickel and cobalt with less impurity components; and a barren liquor having a low and stabilized level of nickel and containing scandium and the like.

In the sulfuration treatment of the sulfuration step S13, sedimentation and separation treatment of a slurry of the mixture of nickel and cobalt sulfides is performed using a sedimentation apparatus such as a thickener to separate and recover the mixture of nickel and cobalt sulfides from the bottom of the thickener. Meanwhile, the barren liquor as an aqueous solution component is overflown for recovery.

In the method of recovering scandium according to the present embodiment, the barren liquor obtained through each step of the hydrometallurgy treatment step S1 of nickel oxide ore can be used as an acidic solution containing scandium and other impurities, the acidic solution being a target for the process for recovering scandium.

<2-2. Scandium (Sc) Elution Step>

As described above, the barren liquor as a scandium-containing acidic solution obtained by leaching nickel oxide ore with sulfuric acid may be used as a target solution for the process for recovering scandium. However, for example, the barren liquor as a scandium-containing acidic solution contains, in addition to scandium, aluminum, chromium and various other impurities remaining in the solution without being sulfurized after the aforementioned sulfuration treatment in the sulfuration step S13. In view of the above, a scandium eluate (scandium-containing solution) is preferably generated by preliminarily removing impurities contained in the acidic solution to concentrate scandium (Sc) in the scandium elution step S2 before the acidic solution is subjected to solvent extraction.

In the scandium elution step S2, impurities such as aluminum contained in the acidic solution may be separated and removed by a method of ion exchange treatment, for example, using a chelating resin to obtain a scandium-containing solution with scandium concentrated.

Figure 2:
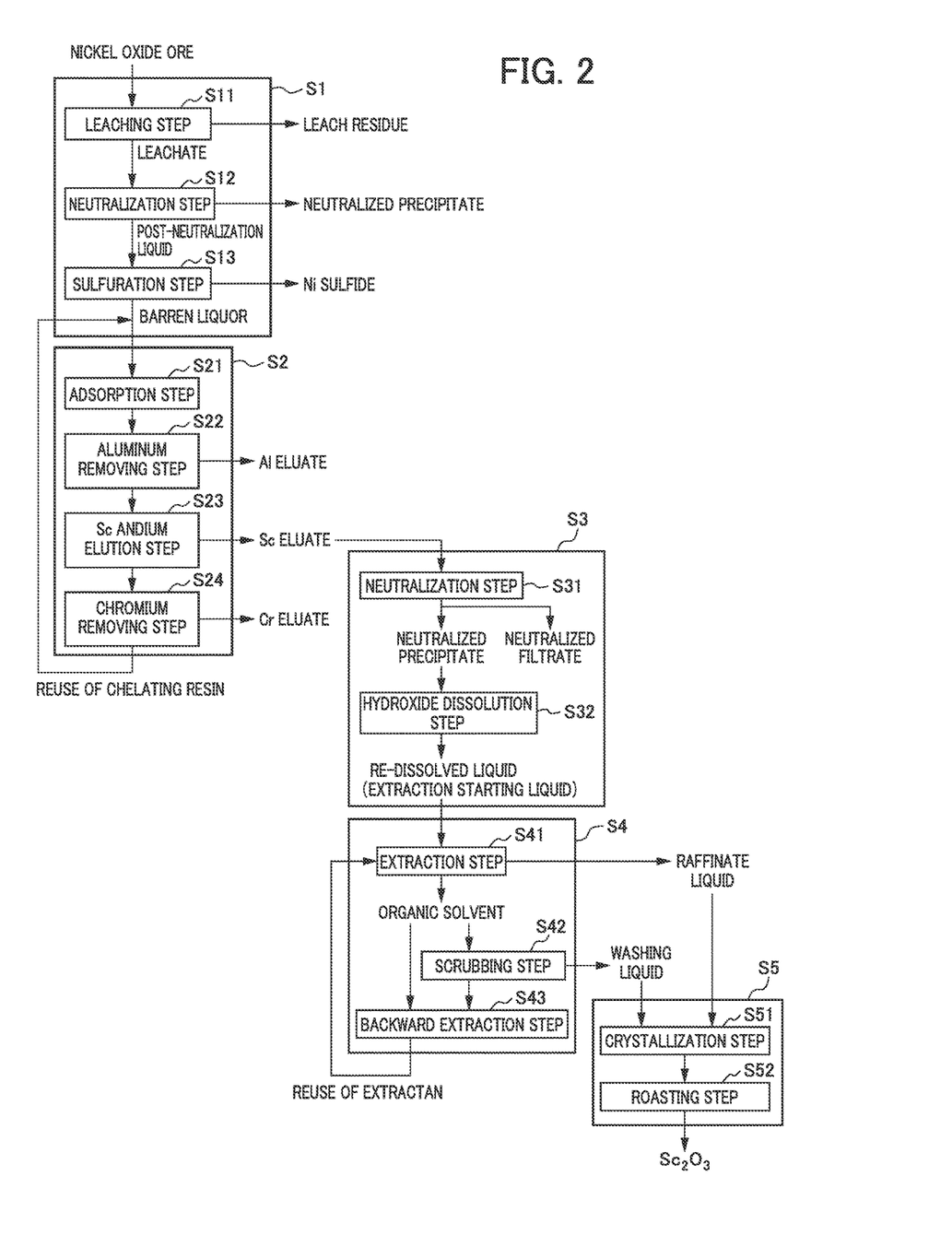
FIG. 2 shows a flow diagram for illustrating an example of the entire process flow in which the method of recovering scandium is used.

FIG. 2 represents a flow diagram showing an example of the method of removing impurities contained in the acidic solution to concentrate and elute scandium, comprising a step (an ion exchange step) of performing an ion exchange reaction using a chelating resin. In this step, the barren liquor obtained from the sulfuration step S13 in the hydrometallurgy treatment step S1 of nickel oxide ore is brought into contact with a chelating resin to allow scandium in the barren liquor to be adsorbed by the chelating resin, and then a scandium (Sc) eluate is obtained. Note that the ion exchange step as an example of the scandium elution step S2 is referred to the "ion exchange step S2".

Specifically, examples of the ion exchange step S2 include a step comprising: an adsorption step S21 of bringing the barren liquor into contact with a chelating resin to allow scandium to be adsorbed by the chelating resin; an aluminum removing step S22 of allowing 0.1 N or less of sulfuric acid to make contact with the chelating resin which has adsorbed scandium to remove aluminum adsorbed by the chelating resin; a scandium elution step S23 of allowing 0.3 N or more and 3 N or less of sulfuric acid to make contact with the chelating resin to obtain a scandium eluate; and a chromium removing step S24 of allowing 3 N or more of sulfuric acid to make contact with the chelating resin which has been subjected to the scandium elution step S23 to remove chromium which has been adsorbed by the chelating resin in the adsorption step S21. Below, an overview of each step will be described, but the ion exchange step S2 shall not be limited to it.

[Adsorption Step]

In the adsorption step S21, the barren liquor is brought into contact with a chelating resin to allow scandium to be adsorbed by the chelating resin. There is no particular limitation for the type of the chelating resin, and for example, a resin having iminodiacetic acid as a functional group can be used.

[Aluminum Removing Step]

In the aluminum removing step S22, the chelating resin which has adsorbed scandium in the adsorption step S21 is brought into contact with 0.1 N or less of sulfuric acid to remove aluminum adsorbed by the chelating resin. Note that when removing aluminum, the pH is preferably maintained in the range of between 1 or more and 2.5 or less, and more preferably maintained in the range of between 1.5 or more and 2.0 or less.

[Scandium Elution Step]

In the scandium elution step S23, the chelating resin which has been subjected to the aluminum removing step S22 is brought into contact with 0.3 N or more and less than 3 N of sulfuric acid to obtain a scandium eluate. When obtaining the scandium eluate, the normality of sulfuric acid used as an eluate is preferably maintained in the range of between 0.3 N or more and less than 3 N, and more preferably maintained in the range of between 0.5 N or more and less than 2 N.

[Chromium Removing Step]

In the chromium removing step S24, the chelating resin which has been subjected to the scandium elution step S23 is brought into contact with 3 N or more of sulfuric acid to remove chromium which has been adsorbed by the chelating resin in the adsorption step S21. A normality of sulfuric acid used as an eluate of less than 3 N is not preferred when removing chromium because chromium may not be removed properly from the chelating resin.

<2-3. Neutralization Step>

As described above, in the scandium elution step S2, scandium is separated from impurities by virtue of the selectivity of the chelating resin, and scandium separated from impurities is recovered as a scandium eluate. However, all impurities may not be completely separated from scandium due to the limited capability of a chelating resin to be used.

Accordingly, separation of scandium from impurities can be further facilitated by subjecting the scandium eluate collected in the scandium elution step S2 to solvent extraction using as the scandium eluate an extraction starting liquid in the solvent extraction step S4 described below.

However, in general, higher is the concentration of the target component in the extraction starting liquid to be subjected to solvent extraction, the higher is the separation performance of unwanted impurities in the solvent extraction step S4. Further, a less amount of a liquid will be subjected to solvent extraction when a higher concentration of scandium is contained in the extraction starting liquid, assuming the same amount of scandium is to be processed. As a result, a less amount of an extractant will be used. This can further provide various advantages such as improved operating efficiency owing to smaller equipment for the solvent extraction treatment.

In view of the above, in the present embodiment, in order to increase the concentration of scandium in the scandium eluate, i.e., in order to concentrate scandium, a neutralizing agent is added to the scandium eluate eluted from the chelating resin in the scandium elution step S2 (the scandium elution step S23) to adjust pH, thereby forming a precipitate of scandium hydroxide. The resulting precipitate of scandium hydroxide is then re-dissolved by adding an acid to obtain a highly concentrated scandium solution (an extraction starting liquid). As described above, the process efficiency of solvent extraction can be improved by subjecting the scandium eluate to the neutralization treatment before the solvent extraction step S4 to concentrate scandium.

Moreover, un-precipitated impurities may be separated out by subjecting a scandium-containing precipitate to solid-liquid separation, the scandium-containing precipitate being temporarily formed from the scandium eluate after performing the aforementioned neutralization treatment.

Specifically, as shown in FIG. 2, this neutralization step S3 includes a neutralization step S31 composed of two stages of adding a neutralizing agent to the scandium eluate to adjust the pH of the solution to a predetermined pH range and obtaining a neutralized residue and a neutralized filtrate and a hydroxide dissolution step S32 of dissolving the neutralized precipitate obtained by adding an acid thereto and obtaining a re-dissolved liquid containing scandium at a high concentration.

[Neutralization Step]

In the neutralization step S31, a neutralizing agent is added to the scandium eluate to adjust the pH of the solution to a predetermined range and scandium contained in the scandium eluate is transformed into a precipitate of scandium hydroxide. In the neutralization step S31, a neutralized precipitate composed of scandium hydroxide and a neutralized filtrate are generated in this way.

The neutralizing agent is not particularly limited, and for example, sodium hydroxide and the like can be used.

Figure 3:
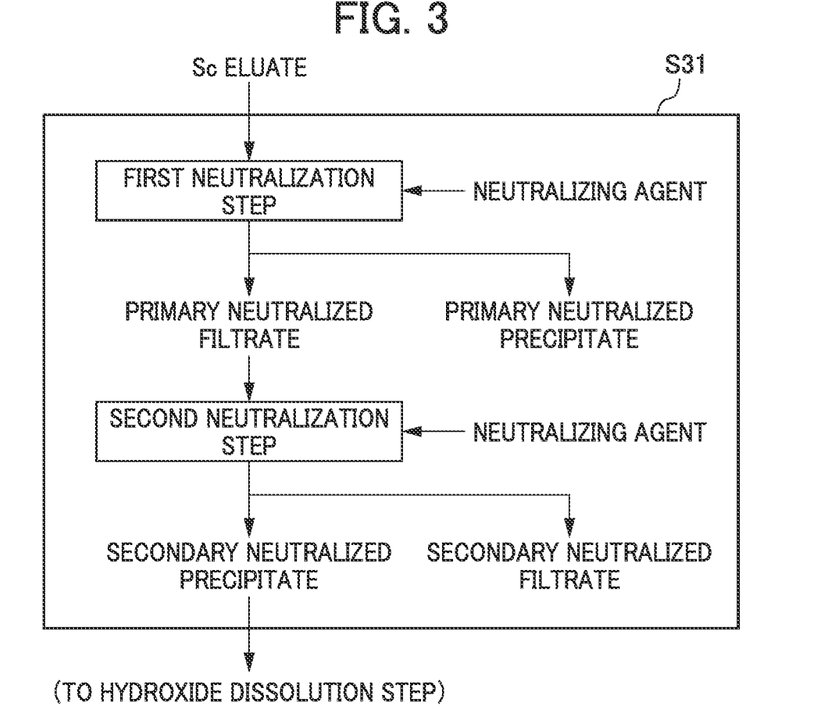
FIG. 3 is a flow diagram for describing the flow of a neutralization step.

Here, in the present embodiment, the pH adjustment by neutralization using a neutralizing agent is performed in two stages as the neutralization treatment in this neutralization step S31. This makes it possible to more efficiently separate impurities and to concentrate scandium. FIG. 3 is a diagram for describing the flow of the two-stage neutralization treatment in the neutralization step S31. As shown in the flow chart of FIG. 3, the neutralization step S31 includes a first neutralization step of performing the first stage of neutralization and a second neutralization step of performing the second stage of neutralization.

(First Neutralization Step)

Specifically, in the neutralization treatment by the two-stage pH adjustment, the first stage of neutralization is performed in which a neutralizing agent such as sodium hydroxide is added to the scandium eluate to adjust the pH of the solution to a predetermined range as the first neutralization step. By this first stage of neutralization, most of impurities such as iron and chromium, which are less basic than scandium, are transformed into precipitates in the form of hydroxides and the primary neutralized precipitate is separated from the primary neutralized filtrate by filtration. Note that scandium is concentrated in the primary neutralized filtrate.

In the neutralization treatment in the first neutralization step, the pH of the solution is preferably adjusted to the range of 3.5 to 4.5 by addition of a neutralizing agent. In addition, the pH of the solution is more preferably adjusted to about 4.0. It is possible to more efficiently concentrate scandium in the primary neutralized filtrate by adding a neutralizing agent to the solution so that the pH of the solution is in this range and thus performing neutralization.

(Second Neutralization Step)

Next, as the second neutralization step, the second stage of neutralization is performed in which a neutralizing agent such as sodium hydroxide is further added to the primary neutralized filtrate obtained by the first stage of neutralization to adjust the pH of the solution to a predetermined range. By this second stage of neutralization, scandium hydroxide is obtained as a secondary neutralized precipitate while nickel, which is a component more basic than scandium, does not precipitate and thus remains in the secondary neutralized filtrate, and the secondary neutralized precipitate, namely, a hydroxide of scandium from which impurities have been separated can be obtained by performing solid-liquid separation.

In the neutralization treatment in the second neutralization step, the pH of the primary neutralization filtrate is adjusted so as to be in the range of preferably 5.5 to 6.5 by addition of a neutralizing agent. In addition, the pH of the primary neutralized filtrate is more preferably adjusted to about 6.0. It is possible to more efficiently generate a precipitate of scandium hydroxide by adding a neutralizing agent to the primary neutralized filtrate so that the pH of the solution is in this range and thus performing neutralization.

The concentration of sodium hydroxide and the like used as a neutralizing agent in the neutralization treatment may be appropriately selected. However, local increase in pH may occur in a reaction vessel when a highly concentrated neutralizing agent of more than 4 N is added. This may result in a local pH of more than 4.5. If this occurs, impurities may disadvantageously be co-precipitated with scandium, and thus high purity scandium may not be obtained. For this reason, a neutralizing agent is preferably a solution diluted to 4 N or less so that neutralization in a reaction vessel proceeds as uniformly as possible.

On the other hand, when the concentration of a neutralizing agent such as a sodium hydroxide solution is too low, the amount of the solution to be added increases accordingly. This is not preferred because the amount of liquid to be handled increases, resulting in a larger equipment size and thus increased cost. For this reason, a neutralizing agent with a concentration of more than 1 N is preferably used.

Note that a precipitate obtained by adding an alkaline neutralizing agent such as sodium hydroxide, like the aforementioned primary neutralized precipitate and secondary neutralized precipitate, usually has very poor filterability. Therefore, a seed crystal may be added to improve filterability when performing neutralization. A seed crystal is preferably added in an amount of about 1 g/L or more relative to a solution before the neutralization treatment.

[Hydroxide Dissolution Step]

In the hydroxide dissolution step S32, the neutralized precipitate (secondary neutralized precipitate) which is recovered through the two-stage neutralization treatment in the neutralization step S31 described above and thus contains scandium hydroxide as a main component is dissolved by adding an acid thereto to obtain a hydroxide solution to be a re-dissolved liquid. In the present embodiment, the re-dissolved liquid thus obtained is used as an extraction starting liquid for the solvent extraction treatment in the solvent extraction step S4 to be described later.

There is no particular limitation the acid for dissolving the neutralized precipitate, but sulfuric acid is preferably used. Note that the re-dissolved liquid is a scandium sulfate solution when sulfuric acid is used.

For example, when sulfuric acid is used, there is no particular limitation for the concentration thereof, but a sulfuric acid solution with a concentration of 2 N or more is preferably used for dissolution in view of the industrially preferred rate of reaction.

Note that it is possible to obtain an extraction starting liquid having an arbitrary scandium concentration by adjusting the slurry concentration at the time of dissolution using sulfuric acid and the like. For example, the pH of the solution is maintained preferably in the range of 0.8 to 1.5 and more preferably about 1.0 when 2 N sulfuric acid is added for dissolution, and it is possible to efficiently perform the dissolution of scandium hydroxide and to suppress loss of scandium recovery due to undissolution by maintaining this pH during the dissolution. Note that with regard to the pH range described above, there is a possibility that dissolution of scandium hydroxide does not efficiently proceed when the pH is more than 1.5. On the other hand, it is not preferable that the pH is as low as less than 0.8 since a strongly acidic solution is obtained, the amount of the neutralizing agent to be added for the wastewater treatment of neutralizing the solution after being subjected to the removal of scandium increases, and the cost and labor thus mount up.

<2-4. Solvent Extraction Step>

Next, in the solvent extraction step S4, the re-dissolved liquid (hydroxide solution) obtained through the neutralization step S3 of subjecting the scandium eluate to a neutralization treatment is used as an extraction starting liquid and this is brought into contact with an extractant to obtain a raffinate liquid containing scandium. Note that the re-dissolved liquid to be subjected to solvent extraction is an acidic solution containing scandium and other impurity elements as described above, and this is referred to as the "scandium-containing solution".

There is no particular limitation for the aspect of the solvent extraction step S4, but a solvent extraction, for example, as shown in FIGS. 1 and 2, is preferably performed, the solvent extraction comprising: an extraction step S41 of mixing the scandium-containing solution with an organic solvent as an extracting agent to allow separation of a post-extraction organic solvent into which impurities and a trace amount of scandium are extracted and a raffinate liquid in which scandium remains; a scrubbing step S42 of mixing the post-extraction organic solvent with a sulfuric acid solution to separate a trace amount of scandium extracted into the post-extraction organic solvent into an aqueous phase, thereby obtaining a post-washing liquid; and a backward extraction step S43 of adding a backward extracting agent to the post-washing organic solvent to perform backward extraction of impurities from the post-washing organic solvent.

(1) Extraction Step

In the extraction step S41, a scandium-containing solution and an organic solvent containing an extractant are mixed together and impurities in the organic solvent are selectively extracted to obtain an organic solvent containing impurities and a raffinate liquid. In the method for recovering scandium according to the present embodiment, a solvent extraction treatment using an amine-based extractant is preferably performed in this extraction step S41. It is possible to more efficiently and effectively extract impurities and thus to separate the impurities from scandium by performing the solvent extraction treatment using an amine-based extractant in this way.

Here, the amine-based extractant has a low selectively for scandium, and does not require a neutralizing agent during extraction, and may have other characteristics. For example, the followings can be used as the amine-based extractant: those known under the trade names of, for example, a primary amine Primene JM-T, a secondary amine LA-1, a tertiary amine TNOA (Tri-n-octylamine), TIOA (Tri-i-octylamine), and the like.

When performing extraction, the amine-based extractant is preferably used after diluted with, for example, a hydrocarbon-based organic solvent and the like. There is no particular limitation for the concentration of the amine-based extractant in an organic solvent, but it is preferably about 1 vol % or more and about 10 vol % or less, in particular more preferably about 5 vol %, in view of phase separability during the extraction and backward extraction described below.

Moreover, there is no particular limitation for the volume ratio of the organic solvent and the scandium-containing solution when performing extraction, but the molar amount of the organic solvent is preferably 0.01 times or more and 0.1 times or less relative to the molar amount of metal in the scandium-containing solution.

(2) Scrubbing (Washing) Step

When a trace amount of scandium is co-existent in a solvent into which impurities are extracted from the scandium-containing solution in the extraction step S41 as described above, a scrubbing (washing) treatment (the scrubbing step S42) is performed on the organic solvent (the organic phase) to separate scandium into the aqueous phase, thereby recovering scandium from the extractant before performing backward extraction of the extract liquid obtained from the extraction step S41.

Washing the organic solvent to separate a trace amount of scandium extracted with the extractant in the scrubbing step S42 as described above can allow scandium to separate into a washing liquid, and thus can further improve the recovery rate of scandium.

For a solution (a washing solution) used for scrubbing, a sulfuric acid solution, a hydrochloric acid solution, and the like can be used. Further, solutions to which water-soluble chlorides and sulfates are added can also be used.

Specifically, when a sulfuric acid solution is used as a washing solution, a solution having a concentration in the range of between 1.0 mol/L or more and 3.0 mol/L or less is preferably used.

The number of washing stages (the number of times) may also depend on the identities and concentrations of impurity elements, and thus may appropriately be selected depending on the amine-based extractant, extraction conditions, and the like to be used. For example, when the phase ratio of the organic phase (O) to the aqueous phase (A), O/A is 1, the number of washing stages of about 3 to 5 can allow scandium extracted into the organic solvent to be separated below the detection limit of an analyzer.

(3) Backward Extraction Step

In the backward extraction step S43, impurities are backward-extracted from the organic solvent used for extracting impurities in the extraction step S41. Specifically, in the backward extraction step S43, the backward extraction solution (the backward extraction starting liquid) is added to and mixed with an organic solvent containing an extractant to effect a reaction opposite to that in the extraction treatment of the extraction step S41. This enables backward extraction of impurities to give a post-backward extraction liquid containing impurities.

As described above, in the extraction treatment in the extraction step S41, preferably, impurities are selectively extracted using an amine-based extractant as an extractant. From this fact, it is preferable to use a solution containing a carbonate such as sodium carbonate or potassium carbonate as the backward extraction solution from the viewpoint of effectively separating the impurities from the organic solvent containing an amine-based extractant and regenerating the extractant.

For example, the concentration of a carbonate-containing solution serving as the backward extraction solution is preferably about 0.5 mol/L or more and 2 mol/L or less in view of avoidance of excessive use.

Note that when scrubbing treatment is performed for the organic solvent containing an extractant in the scrubbing step S42 as described above, a backward extraction solution may similarly be added to the post-scrubbing extractant to perform the backward extraction treatment.

An extractant from which impurities has been separated out by performing the backward extraction treatment in which a solution of a carbonate salt such as sodium carbonate is added to a post-extraction extractant or a post-scrubbing extractant as described above can be used again repeatedly as an extractant in the extraction step S41.

<2-5. Scandium Recovery Step>

Next, in the scandium recovery step S5, scandium is recovered from the raffinate liquid obtained from the extraction step S41 in the solvent extraction step S4, or from the washing liquid after scrubbing when scrubbing is performed in the scrubbing step S42.

[Crystallization Step]

The crystallization step S51 is a step of crystallizing scandium contained in the raffinate liquid and the like into a precipitate of a scandium salt and recovering the precipitate.

The method of crystallizing and recovering scandium is not particularly limited, and a known method can be used, but examples thereof may include a method in which an alkali is added to the raffinate liquid and the like, a neutralization treatment is performed, and a precipitate of scandium hydroxide is generated and recovered. It is also possible to use a method (oxalate-formation treatment) in which a precipitate of an oxalate is generated using an oxalic acid solution and recovered. According to these methods, it is possible to more effectively separate impurities and thus to obtain crystals of scandium, which is preferable.

Note that the crystals such as scandium hydroxide and scandium oxalate obtained by the methods described above can be transformed into high purity scandium oxide by subjecting the crystals to solid-liquid separation, then washing, and a treatment in the roasting step S52 to be described later.

[Roasting Step]

The roasting step S52 is a step of washing the precipitate of scandium hydroxide, scandium oxalate, and the like obtained in the crystallization step S51 with water, drying the precipitate, and then roasting the precipitate. Scandium can be recovered as extremely high purity scandium oxide by being subjected to this roasting treatment.

There is no particular limitation for the roasting conditions, but for example, heating in a tubular furnace at about 900° C. for about 2 hours may be used. Note that a continuous furnace such as a rotary kiln is preferably used for industrial production because both drying and roasting can be performed with the same equipment.

EXAMPLES

Below, the present invention will be described in more detail with reference to Examples. However, the present invention shall not in any sense be limited to these Examples.

<<Investigation on pH and Precipitation Behavior in Neutralization Treatment>>

Pressurized acid leaching of nickel oxide ore with sulfuric acid was performed according to the known method such as the method described in Patent Document 1. The pH of the resulting leachate was adjusted to remove impurities and then a sulfurizing agent was added to the leachate to separate nickel, thereby preparing a barren liquor. Table 1 below shows the concentrations of scandium, aluminum, and iron in the resulting barren liquor.

Note that when a neutralizing agent was added to a solution having the above composition to form a precipitate, thereby obtaining a hydroxide comprising scandium and other impurity components, the grade of scandium hydroxide was as low as about 0.1 wt %.

TABLE 1

| Composition of barren liquor | Sc | Al | Fe |
|---|---|---|---|
| [mg/L] | 14 | 2,800 | 1,000 |

Next, the barren liquor in Table 1 was subjected to an ion exchange treatment by a known method using a chelating resin to obtain a scandium eluate having the composition shown in Table 2 below.

TABLE 2

| Scandium eluate | Sc | Al | Fe | Ni | Cr |
|---|---|---|---|---|---|
| [mg/L] | 100 | 30 | 40 | 10 | 2 |

Next, the resulting scandium eluate (composition in Table 2) was sampled, placed in a container, and a 4 N sodium hydroxide solution was then added thereto with stirring to adjust the pH to 1.

Subsequently, it was allowed to stand after stopping stirring. The amount of the liquid was then measured, and the supernatant (primary neutralized filtrate) after the precipitate (primary neutralized precipitate) was sedimented was collected. Then, stirring was started again, and a 4 N sodium hydroxide solution was added again to adjust the pH of the solution to 2. Then it was allowed to stand after stopping stirring. The amount of the liquid was then measured, and the supernatant (secondary neutralized filtrate) was collected. Then stirring was started again. This procedure was repeated to prepare samples of the respective scandium eluates having a pH of the solution in the range of 1 to 6.

Each sample prepared was analyzed by ICP for the components such as scandium, iron, aluminum, and nickel. Note that the amount calculated from the analytical value of each component and the fluid volume of each sample corresponds to the amount of that component present in the solution at each pH. The difference between the amount of the component present in the solution and the initial amount calculated from the analytical value and the initial volume of the scandium eluate shown in Table 2 corresponds to the amount of the precipitate generated by the pH adjustment (neutralization). The ratio obtained by dividing the amount of the precipitate by the aforementioned initial amount is defined as the precipitation rate (%).

Figure 4:
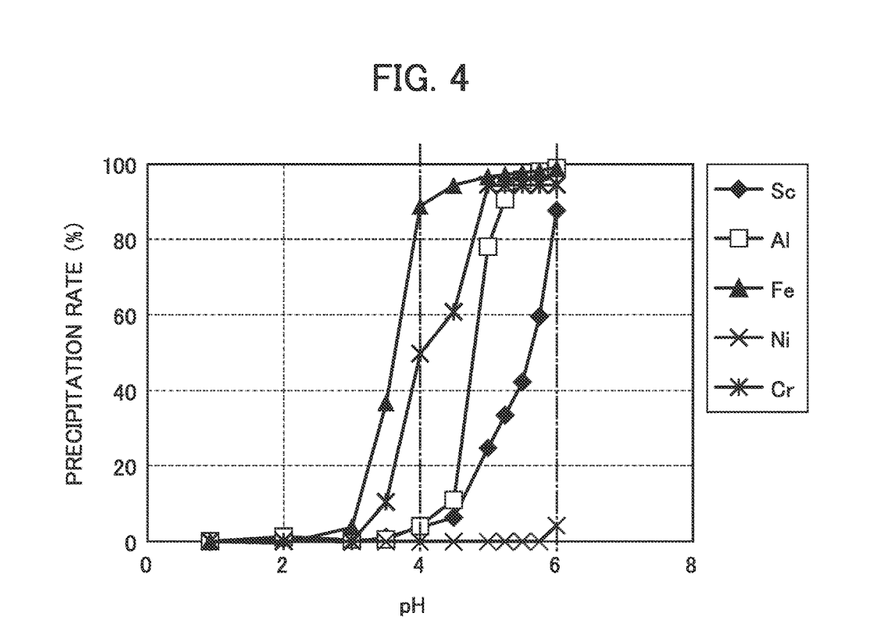
FIG. 4 is a graphical representation showing the pH of a solution and the ratio (precipitation rate) of each element precipitated from the solution when a neutralizing agent is added to a scandium eluate.

FIG. 4 shows each pH and the precipitation rates of the components shown in Table 2. As shown in the graphical representation of FIG. 4, iron is found to show increased precipitation rates in the pH region of more than 3, and almost completely precipitated at 4.5 to 5 or more. Moreover, aluminum is found to show increased precipitation rates when the pH is more than 4.5. In contrast, scandium is also found to show increased precipitation rates when the pH is more than 4.5, but the increase is more gradual than that of aluminum. Note that nickel starts to precipitate when the pH is becoming more than 6.

EXAMPLES: TWO-STAGE NEUTRALIZATION TREATMENT

Example 1

(First Stage of Neutralization)

Based on the results shown in FIG. 4, the scandium eluate having a composition shown in Table 2 was placed in a container and a 4 N sodium hydroxide solution was added thereto with stirring so that the pH of the solution was adjusted to 4, thereby performing the first stage of neutralization treatment.

After this first stage of neutralization treatment, solid-liquid separation was performed using filter paper and Nutsche, and as a result, a primary neutralized precipitate and a primary neutralized filtrate were obtained.

By analysis using ICP, the ratio (partitioning) of the amount of a precipitate generated to the amount of substance contained in the scandium eluate having the composition shown in Table 2 was evaluated as the precipitation rate (%). Table 3 below shows the precipitation rates by the first stage of neutralization treatment.

TABLE 3

| Precipitation rate of each element component | Sc | Al | Fe | Ni | Cr |
|---|---|---|---|---|---|
| [%] | 4 | 4 | 89 | 0 | 50 |

As shown in Table 3, iron and chromium as impurities in the solution were able to be effectively precipitated as neutralized precipitates by adding a neutralizing agent to the solution until the pH of the solution became 4 and thus performing neutralization, and were able to be separated from scandium which was partitioned into the primary neutralized filtrate.

(Second Stage of Neutralization)

Next, the resulting primary neutralized filtrate was placed in a container, and a 4 N sodium hydroxide solution was added thereto so that the pH of the solution was adjusted to 6, thereby performing the second stage of neutralization treatment.

After this second stage of neutralization treatment, solid-liquid separation was performed as in the first stage of neutralization treatment, and as a result, a secondary neutralized precipitate and a secondary neutralized filtrate were obtained.

By analysis using ICP, the ratio (partitioning) of the amount of a precipitate generated to the amount of substance contained in the primary neutralized filtrate was analyzed as the precipitation rate (%). Table 4 below shows the precipitation rates by the second stage of neutralization treatment.

TABLE 4

| Precipitation rate of each element component | Sc | Al | Fe | Ni | Cr |
|---|---|---|---|---|---|
| [%] | 88 | 99 | 99 | 4 | 94 |

As shown in Table 4, almost 90% of scandium mostly remained in the filtrate without precipitating in the first stage of neutralization was partitioned into the secondary neutralized precipitate by the second stage of neutralization. In contrast, nickel, which was more basic than scandium, did not precipitate during either the first or second stage of neutralization, and remained in the secondary neutralized filtrate, and thus was able to be effectively separated from scandium.

Note that it seems that among the components (composition shown in Table 2) in the scandium eluate, large amounts of iron and chromium also precipitate in the second stage of neutralization from the results shown in Table 4. However, most of these components have already partitioned into the primary neutralized precipitate in the first stage of neutralization, and have been separated from scandium. Therefore, the amount of these components to be partitioned into the secondary neutralized precipitate itself is reduced.

From the above results, it has been found that with reference to the ratios (precipitation rates) of the components partitioned into the secondary neutralized precipitate from which scandium has been solidified and recovered to those contained in the scandium eluate, aluminum is significantly precipitated other than scandium and iron, chromium, nickel, and others are effectively separated by performing such a two-stage neutralization treatment as shown in Table 5 below.

TABLE 5

| Precipitation rate of each element component | Sc | Al | Fe | Ni | Cr |
|---|---|---|---|---|---|
| [%] | 82 | 99 | 6 | 4 | 31 |

<<Recovery of Scandium>>

(Hydroxide Dissolution Treatment)

Next, a 2 N sulfuric acid solution was added to the resulting secondary neutralized precipitate, and dissolution was performed while maintaining the pH at around 1 to obtain a re-dissolved liquid (hydroxide solution) shown in Table 6 below.

TABLE 6

| Re-dissolved liquid | Sc | Al | Fe |
|---|---|---|---|
| [g/L] | 20 | 7.2 | 0.6 |

(Solvent Extraction Treatment)

Next, 50 liters of an organic solvent in which an amine-based extractant (The Dow Chemical Company, Primene JM-T) was adjusted to 5 vol % with a solvent (Shellsol A150, Shell Chemicals Japan, Ltd.) was mixed with 100 liters of the re-dissolved liquid having the composition shown in Table 6 as an extraction starting liquid, and the mixture was stirred at room temperature for 60 minutes to effect a solvent extraction treatment. By this solvent extraction treatment, a raffinate liquid containing scandium was obtained. Note that no cladding was formed during extraction, and phase separation after still standing also proceeded rapidly.

The composition of each element contained in the organic phase extract obtained by the above extraction was analyzed. The percentage of the value obtained by dividing the amount of each element contained in the organic phase extract by the amount of that element contained in the pre-extraction liquid (extraction starting liquid) was calculated, and the results are shown in Table 7 below as the extraction rate (%).

TABLE 7

| Extraction rates of various elements | Sc | Al | Fe |
| --- | --- | --- | --- |
| [%] | 4 | — | — |

(Note that "—" in Table 7 indicates that it was not analyzed or the measured value was less than the lower measurement limit.)

(Note that "-" in Table 7 indicates that it was not analyzed or the measured value was less than the lower measurement limit.)

As seen from the results of extraction rates shown in Table 7, the majority of scandium contained in the pre-extraction liquid was partitioned into the raffinate liquid through the solvent extraction treatment. Note that other impurities were transferred to the organic solvent and were able to be effectively separated from scandium although not shown in Table 7.

Subsequently, 50 liters of a 1 mol/L sulfuric acid solution was mixed with 50 liters of the organic solvent which was obtained after the extraction treatment and contained a slight amount of scandium (the organic phase extract) so that the phase ratio (O/A) became 1, and the mixture was stirred for 60 minutes, and then washed. Then, the mixture was allowed to stand for separation of the aqueous phase. The organic phase was again mixed with 50 liters of a fresh 1 mol/L sulfuric acid solution, and washed. The aqueous phase was then separated in a similar manner. The washing operation as described above was repeated 5 times in total.

By washing the organic phase extract for 5 times in this way, scandium contained in the organic phase extract was allowed to separate into the aqueous phase, enabling recovery of scandium. In contrast, impurities contained in the organic phase extract were eluted at levels of as low as 1 mg/L, showing that only scandium extracted into the organic solvent was able to be effectively separated into the aqueous phase, and only impurities were able to be removed.

Subsequently, 1 mol/L sodium carbonate was mixed with the organic phase extract after washing so as to give a phase ratio O/A of 1/1, and stirred for 60 minutes to effect backward extraction of impurities into the aqueous phase.

The composition of various elements contained in the post-backward extraction liquid obtained by this backward extraction operation was analyzed. The percentage of the value obtained by dividing the amount of each element contained in the post-backward extraction liquid by the amount of that element extracted into the organic phase by the extraction treatment was calculated, and the results are shown in Table 8 below as the recovery rate (%).

TABLE 8

| Recovery rates of various elements | Sc | Al | Fe |
| --- | --- | --- | --- |
| [%] | 25 | — | — |

(Note that "—" in Table 8 indicates that it was not analyzed or the measured value was less than the lower measurement limit.)

(Note that "-" in Table 8 indicates that it was not analyzed or the measured value was less than the lower measurement limit.)

As seen from the results of recovery rates shown in Table 8, most of iron and aluminum were able to be separated and scandium was able to be recovered by performing the solvent extraction treatment described above.

(Oxalate-Formation Treatment)

Next, crystals of oxalic acid dihydrate (Mitsubishi Gas Chemical Company, Inc.) was dissolved in the resulting raffinate liquid in an amount calculated to be twice of the amount of scandium contained in that raffinate liquid, and stirred and mixed for 60 minutes to generate a white crystalline precipitate of scandium oxalate.

(Roasting Treatment)

Next, the resulting precipitate of scandium oxalate was filtered by aspiration, and washed with pure water, and was dried at 105° C. for 8 hours. Then, the dried scandium oxalate was placed in a tubular furnace, and maintained at 850° C. to 900° C. to perform roasting (calcination), thereby obtaining scandium oxide.

The scandium oxide obtained by performing roasting was analyzed by the emission spectroscopic analysis. Table 9 below shows the removal rates (%) each obtained by dividing the content of a material after roasting by the content of that material before the oxalate-formation treatment.

TABLE 9

| Removal rates of various elements | Sc | Al | Fe |
| --- | --- | --- | --- |
| [%] | 0 | 100 | 99.9 |

As seen from the results of the removal rates in Table 9, aluminum and iron other than scandium as well as other impurities not shown in the table were able to be removed almost completely, and ultra high purity scandium oxide of which the purity as scandium oxide ($Sc_2O_3$) was more than 99.9 wt % was able to be obtained.

COMPARATIVE EXAMPLE

Comparative Example 1

The barren liquor which was used in Example 1 and had the same composition as that shown in Table 1 above was subjected to an ion exchange treatment by the same method as in Example 1 to obtain a scandium eluate having the same composition as that shown in Table 2.

(One-Stage Neutralization)

Based on the results shown in FIG. 4, a 4 N sodium hydroxide solution was added to the scandium eluate and the scandium eluate was neutralized so that the pH of the solution was in the range of 5 to 6 to generate a precipitate. Then, solid-liquid separation was performed to obtain a precipitate of scandium hydroxide.

Next, 2 N sulfuric acid was added to the resulting scandium hydroxide, and dissolution was performed while maintaining the pH at around 1 to obtain a re-dissolved liquid having a composition shown in Table 10 below.

TABLE 10

| Re-dissolved liquid | Sc | Al | Fe |
| --- | --- | --- | --- |
| [g/L] | 20 | 10 | 4 |

When the re-dissolved liquid (composition shown in Table 10) obtained by the conventional method is compared with the re-dissolved liquid obtained in Example 1, namely, the re-dissolved liquid (composition shown in Table 6) obtained through the two-stage neutralization treatment, there is a large difference in aluminum concentration and iron concentration although the scandium concentration is the same. That is, it has been confirmed that aluminum and iron, which are impurities, can be effectively separated by performing a two-stage neutralization treatment as performed in Example 1.

The invention claimed is:

1. A method of recovering scandium, comprising:
   a first neutralization step of allowing a solution containing scandium to pass through an ion exchange resin, adding a neutralizing agent to an eluate eluted from the ion exchange resin, performing a neutralization treatment, and obtaining a primary neutralized precipitate and a primary neutralized filtrate by solid-liquid separation;
   a second neutralization step of further adding a neutralizing agent to the primary neutralized filtrate, performing a neutralization treatment, and obtaining a secondary neutralized precipitate and a secondary neutralized filtrate by solid-liquid separation;
   a hydroxide dissolution step of adding an acid to the secondary neutralized precipitate to obtain a hydroxide solution;
   a solvent extraction step of subjecting the hydroxide solution to solvent extraction; and
   a scandium recovery step of recovering scandium oxide from a raffinate liquid separated in the solvent extraction step,
   wherein the secondary neutralized precipitate is dissolved using sulfuric acid as the acid so that pH of a hydroxide solution to be obtained is maintained in the range of 0.8 to 1.5 in the hydroxide dissolution step.

2. The method of recovering scandium according to claim 1, wherein pH of the eluate is adjusted to the range of 3.5 to 4.5 in the first neutralization step.

3. The method of recovering scandium according to claim 1, wherein pH of the primary neutralized filtrate is adjusted to the range of 5.5 to 6.5 in the second neutralization step.

4. The method of recovering scandium according to claim 1, wherein the solution containing scandium to pass through the ion exchange resin is a barren liquor to be obtained by hydrometallurgy of nickel oxide ore, the hydrometallurgy including:
   a leaching step of leaching the nickel oxide ore with sulfuric acid under high temperature and high pressure to obtain a leachate;
   a neutralization step of adding a neutralizing agent to the leachate to obtain a neutralized precipitate containing impurities and a post-neutralization liquid; and
   a sulfuration step of adding a sulfurizing agent to the post-neutralization liquid to obtain nickel sulfide and a barren liquor.

5. The method of recovering scandium according to claim 2, wherein the solution containing scandium to pass through the ion exchange resin is a barren liquor to be obtained by hydrometallurgy of nickel oxide ore, the hydrometallurgy including:
   a leaching step of leaching the nickel oxide ore with sulfuric acid under high temperature and high pressure to obtain a leachate;
   a neutralization step of adding a neutralizing agent to the leachate to obtain a neutralized precipitate containing impurities and a post-neutralization liquid; and
   a sulfuration step of adding a sulfurizing agent to the post-neutralization liquid to obtain nickel sulfide and a barren liquor.

6. The method of recovering scandium according to claim 3, wherein the solution containing scandium to pass through the ion exchange resin is a barren liquor to be obtained by hydrometallurgy of nickel oxide ore, the hydrometallurgy including:
   a leaching step of leaching the nickel oxide ore with sulfuric acid under high temperature and high pressure to obtain a leachate;
   a neutralization step of adding a neutralizing agent to the leachate to obtain a neutralized precipitate containing impurities and a post-neutralization liquid; and
   a sulfuration step of adding a sulfurizing agent to the post-neutralization liquid to obtain nickel sulfide and a barren liquor.

* * * * *